United States Patent
Li

(10) Patent No.: US 11,124,454 B2
(45) Date of Patent: *Sep. 21, 2021

(54) ARTIFICIAL STONE WITH NON-NATURAL MINERAL AS MAIN MATERIAL AND ITS PREPARATION METHOD

(71) Applicant: Sinostone (Guangdong) Co., Ltd., Foshan (CN)

(72) Inventor: Yong Li, Foshan (CN)

(73) Assignee: Sinostone (Guangdong) Co., Ltd.

(*) Notice: Subject to any disclaimer, the term of this patent is extended or adjusted under 35 U.S.C. 154(b) by 275 days.

This patent is subject to a terminal disclaimer.

(21) Appl. No.: 16/179,275

(22) Filed: Nov. 2, 2018

(65) Prior Publication Data

US 2020/0115281 A1    Apr. 16, 2020

(30) Foreign Application Priority Data

Oct. 10, 2018 (CN) .......................... 201811177886.1

(51) Int. Cl.
| | | |
|---|---|---|
| *C04B 26/18* | (2006.01) | |
| *C04B 14/06* | (2006.01) | |
| *C04B 14/22* | (2006.01) | |
| *C04B 103/54* | (2006.01) | |

(52) U.S. Cl.
CPC .............. *C04B 26/18* (2013.01); *C04B 14/06* (2013.01); *C04B 14/22* (2013.01); *C04B 2103/54* (2013.01)

(58) Field of Classification Search
CPC ..... C04B 14/06; C04B 14/22; C04B 2103/54; C04B 40/0089; C04B 40/0263; C04B 26/02; C04B 26/18; C04B 24/42; C04B 2111/542

See application file for complete search history.

(56) References Cited

U.S. PATENT DOCUMENTS

2018/0179110 A1* 6/2018 Lee .......................... B29C 43/56

FOREIGN PATENT DOCUMENTS

| CN | 1153148 A | 7/1997 |
|---|---|---|
| CN | 103009699 A | 4/2013 |
| CN | 103553436 A | 2/2014 |
| CN | 103833265 A | 6/2014 |
| CN | 104291734 A | 1/2015 |
| CN | 106746920 A | 5/2017 |
| CN | 106977136 A | 7/2017 |

OTHER PUBLICATIONS

Chinese Search Report for Application No. 201811177886.1 dated Mar. 13, 2019, 1 page.
Chinese Search Report for Application No. 201811177894.6 dated Feb. 18, 2019, 1 page.

* cited by examiner

*Primary Examiner* — Shuangyi Abu Ali
(74) *Attorney, Agent, or Firm* — Lerner, David, Littenberg, Krumholz & Mentlik, LLP

(57) ABSTRACT

An artificial stone with non-natural mineral as main material, its raw materials calculated by mass percent include: resin 8-16%, quartz sand aggregate 0-45%, glass particle aggregate 14-60%, quartz powder 0-32%, glass powder 0-32%, tile powder 5-32%, ultrafine quartz powder 0-5% and pigment 0-2%; its main materials also include curing agent and coupling agent; in the formula of artificial stone, the total mass of glass particle aggregate and glass powder is greater than the total mass of quartz sand aggregate, quartz powder and ultrafine quartz powder. Glass particle aggregate and glass powder are made of recycled waste glass, and tile powder is made of recycled waste vitreous polished tiles. The artificial stone in this invention takes non-natural minerals as main fillers, a new formula system is formed, which adopts wastes as main padding, provides more recycling applications of wastes and has more environmental protection meanings.

4 Claims, No Drawings

ARTIFICIAL STONE WITH NON-NATURAL MINERAL AS MAIN MATERIAL AND ITS PREPARATION METHOD

CROSS REFERENCE TO RELATED APPLICATIONS

The present application claims priority from Chinese Patent Application No. 201811177886.1, filed Oct. 10, 2018, the disclosure of which is hereby incorporated herein by reference.

FIELD OF TECHNOLOGY

This invention relates to the technical field of artificial stone, in particular to, an artificial stone with non-natural mineral as main material and its preparation method.

BACKGROUND ART

Artificial quartz stone is an artificial stone processed through steps of vacuuming, vibrating and compacting, and curing, with quartz sand powder as main filler and unsaturated polyester resin as bonding agent. It is hard, compact in structure, and has the characteristics of resistance to abrasion, pressure, high temperature, corrosion, and permeation incomparable by other decorative materials. Artificial quartz stone is widely applied in hotel, restaurant, bank, hospital, exhibition hall, laboratory, and other public buildings as well as home decorations of countertop, commode, kitchen and toilet walls, dining table, tea table, sill, and door pocket.

In the fillers of artificial quartz stone, the quartz aggregate and the quartz powder used are up to more than 50% in weight percentage, and quartz sand and powder are main materials, for this reason, the artificial stone mainly based on quartz sand and powder is called as artificial quartz stone. Although artificial quartz stone has advantages of resistance to abrasion, pressure, high temperature, corrosion, and permeation.

Its raw materials adopt non-renewable resources, such as raw materials of natural minerals, and existing technology also refers to the addition of waste glass particles, but the dose usually below 30% of the total raw materials with low recycling effect for wastes, so it is hard to reach better resource recycling effect.

SUMMARY OF THE INVENTION

The purpose of this invention is to provide an artificial stone with non-natural mineral as main material as well as its preparation method, and such artificial stone is a new artificial stone, which raw material adopts wastes with good environmental protection meanings.

To reach this purpose, following technical proposal is adopted by this invention:

An artificial stone with non-natural mineral as main material, whose raw materials calculated by mass percent include: resin 8-16%, quartz sand aggregate 0-45%, glass particle aggregate 14-60%, quartz powder 0-32%, glass powder 0-32%, tile powder 5-32%, ultrafine quartz powder 0-5% and pigment 0-2%;

Its main materials also include curing agent and coupling agent, the mass ratio of the curing agent and the resin used is 0.5-2:100 and the mass ratio of the coupling agent and the resin used is 0.5-2:100;

In the formula of artificial stone, the total mass of glass particle aggregate and glass powder is greater than the total mass of quartz sand aggregate, quartz powder and ultrafine quartz powder;

Glass particle aggregate and glass powder are made of recycled waste glass, and tile powder is made of recycled waste vitreous polished tiles.

Further, the total mass of quartz sand aggregate and glass particle aggregate accounts for 50-60% of total raw materials of the artificial stone, and the total mass of quartz powder, glass powder, tile powder and ultrafine quartz powder accounts for 25-32% of total raw materials of the artificial stone.

Further, when the quartz sand aggregate and the quartz powder used are both zero, the glass particle aggregate, the glass powder, tile powder and the ultrafine quartz powder used by mass percent are: glass particle aggregate 50-60%, glass powder 5-25%, tile powder 5-20% and ultrafine quartz powder 0-5%.

Further, when the quartz sand aggregate, quartz powder and the glass powder used are both zero, the glass particle aggregate, the tile powder and the ultrafine quartz powder used by mass percent are: glass particle aggregate 50-60%, tile powder 20-32%, and ultrafine quartz powder 0-5%.

Further, quartz sand aggregate is the quartz mineral particles with particle diameter falling into the range of 2-120 meshes;

Glass particle aggregate is the broken glass with particle diameter falling into the range of 2-120 meshes;

Quartz powder is the 325-mesh or 400-mesh quartz mineral fine powder;

Glass powder is the powder grinded by 325-mesh or 400-mesh broken glass;

Tile particle diameter of the tile powder is 325-mesh or 400-mesh;

Superfine quartz powder is the quartz mineral superfine powder falling into the range of 600-3000 meshes.

A preparation method of artificial stone with non-natural mineral as main material, including the following steps:

(1) Materials mixing: Put the raw materials of artificial stone except for pigment into an agitator to stir evenly according to the formula ratio, and mix them to obtain a mixture;
(2) Materials spreading: Blank the mixture into a die, to complete the materials spreading;
(3) Pressing: Eliminate the air in the mixture in step (2) by use of vacuum extractor, and when the vacuum degree reaches −96 kPa or above, start the pressing equipment, to press the mixture into a green body;
(4) Curing: Send the green body into curing equipment for curing, with curing temperature 80-100° C., and curing time 50-120 min;
(5) Post-treatment: The artificial stone after curing will be subject to one or more of polishing treatment, crystal treatment, and heterotypic processing, to obtain the finished artificial stone;

The pigment in the raw materials of the artificial stone will be added in step (1) or step (2), or the mentioned pigment will be added in batches in step (1) and step (2).

Further, in step (1), the operation to put the raw materials of artificial stone into the agitator is: Put the quartz sand aggregate and glass particle aggregate into the agitator by formula ratio, and mix them evenly, to obtain the aggregate particles; put the quartz power, glass powder, tile powder and ultrafine quartz powder respectively into the aggregate particles under continuous mixing to mix jointly and evenly;

Then, add the resin added with curing agent and coupling agent and mixed evenly ahead of time into the mixture of aggregate particle and power under mixing, to mix them at a high speed, until the mixture becomes uniform.

Further, the method to add the pigment contained in the raw materials of the artificial stone is:

In step (1), add the pigment into the resin ahead of time and mix them evenly;

or, in step (2), lead the pigment by powder spreader or manual powering into the designated position of mixture in the spreading die to form patterns.

Further, in step (5), heterotypic processing refers to: the artificial stone after curing is subject to one or more of beveling, rounding, trepanning, sand blasting, abrasive brushing, copying, and engraving, and after completion of heterotypic processing, the part needing polishing of artificial stone will be grinded and polished through polishing with grinding machine and/or waterproof abrasive paper.

The Beneficial Effect of this Invention is:

The artificial stone in this invention takes non-natural minerals, such as glass and/or tile powder as main fillers, and a new formula system is formed, to obtain a new artificial stone, which extends the varieties. In addition, the artificial stone mentioned in this invention with waste glass and/or tile powder as main padding, which provides more recycling applications of wastes and has more environmental protection meanings. When the dose of glass particle aggregate and glass powder is high, the artificial stone has a better permeability, and can provide a better decorative effect. Moreover, glass particle aggregate and glass powder have a smaller resin adsorption than quartz sand aggregate and quartz powder, so the use of resin can be saved to a certain degree, and furthermore, the volatilization of harmful substances during curing can be reduced, to effectively improve the production environment and reduce the difficulty in harmful gas treatment.

DETAILED DESCRIPTION

The technical proposal of this invention is further specified in combination with specific embodiments.

To reach this purpose, following technical proposal is adopted by this invention:

An artificial stone with non-natural mineral as main material, whose raw materials calculated by mass percent include: resin 8-16%, quartz sand aggregate 0-45%, glass particle aggregate 14-60%, quartz powder 0-32%, glass powder 0-32%, tile powder 5-32%, ultrafine quartz powder 0-5% and pigment 0-2%;

Its main materials also include curing agent and coupling agent, the mass ratio of the curing agent and the resin used is 0.5-2:100 and the mass ratio of the coupling agent and the resin used is 0.5-2:100;

In the formula of artificial stone, the total mass of glass particle aggregate and glass powder is greater than the total mass of quartz sand aggregate, quartz powder and ultrafine quartz powder.

Glass particle aggregate and glass powder are made of recycled waste glass, and tile powder is made of recycled waste vitreous polished tiles.

In the raw materials of artificial stone, with the addition of glass particle aggregate and glass powder, the stone has a better permeability on the whole, and the addition of tile powder and glass with large amount also the composition of the entire formula system is changed, causing the proportion of non-quartz sand/power to exceed that of quartz sand/powder in the entire formula system, therefore, a brand new product different from artificial quartz stone is provided, extending the varieties and more applications of artificial stone.

Under the condition of same particle diameter, glass particle aggregate and glass powder have a smaller resin adsorption than quartz sand aggregate and quartz powder (oil absorption rate of powder: the ability of powder of unit mass to absorb the oil substances at maximum, i.e., the ability that oil substances just wrap the filler particle surface completely, and the gap between the filler particles is filled up; the needed oil substances with a bigger mass will have a higher oil absorption), when the addition of glass particle aggregate and glass powder with large amount so the use of resin can be saved to a certain degree, and furthermore, the volatilization of harmful substances during curing will be reduced, to effectively improve the production environment and reduce the difficulty in harmful gas treatment.

Quartz sand aggregate and glass particle aggregate play a role of framework in the entire formula system; quartz powder, glass powder, tile powder and ultrafine quartz powder shall be used for filling the gaps between aggregate particles; resin, as a binder, can bind all aggregate and power materials; curing agent helps the resin to have adhesive polymerization under a certain temperature, to form macromolecule; coupling agent is used for changing the hydrophilic and lipophilic characteristics on the inorganic aggregate surface, to make the resin have a better binding with aggregate and powder materials. The role of pigment is color modulation, and in practical production, the pigment usage and variety can be adjusted according to demands, to realize the production of artificial stone with different color patterns.

It is important to note that, glass particle aggregate and/or glass powder may be ordinary flint glass, or particles with colors, and the glass particles with colors can help the artificial stone product in this invention to have richer colors and patterns, and the color presented with colored glass particle/aggregate and/or glass powder is different from the color presented through addition of pigment in the formula system, and it has richer levels, to provide a broader space for artificial stone application.

Further, the total mass of quartz sand aggregate and glass particle aggregate accounts for 50-60% of total raw materials of the artificial stone, and the total mass of quartz powder, glass powder, tile powder and ultrafine quartz powder accounts for 25-32% of total raw materials of the artificial stone. The aggregate and powder materials in such ranges can fill the holes between the aggregate particles, so that the artificial stone product can have the optimal hardness and strength as well as the lowest water absorption.

Further, when the quartz sand aggregate and the quartz powder used are both zero, the glass particle aggregate, the glass powder, tile powder and the ultrafine quartz powder used by mass percent are: glass particle aggregate 50-60%, glass powder 5-25%, tile powder 5-20% and ultrafine quartz powder 0-5%. When no quartz sand aggregate and quartz powder are included in the artificial stone formulation system, only glass particle aggregate plays a role of support, glass powder, tile powder and ultrafine quartz powder are fillers. The productivity of China tiles are extremely high, waste construction waste tiles are also with high quantity, existing technology applies limit waste tiles, but this invention adopts recycled waste tiles, which provides new application of waste tiles and plays an important role in recycling construction wastes.

Further, when the quartz sand aggregate, quartz powder and glass powder used are both zero, the glass particle aggregate, the tile powder and the ultrafine quartz powder used by mass percent are: glass particle aggregate 50-60%, tile powder 20-32%, and ultrafine quartz powder 0-5%. When no quartz sand aggregate and glass powder are included in the artificial stone formulation system, only glass particle aggregate plays a role of support, quartz powder, tile powder and ultrafine quartz powder are fillers. The productivity of China tiles are extremely high, waste construction waste tiles are also with high quantity, existing technology applies limit waste tiles, but this invention adopts recycled waste tiles, which provides new application of waste tiles and plays an important role in recycling construction wastes.

Further, quartz sand aggregate is the quartz mineral particles with particle diameter falling into the range of 2-120 meshes, and the particle diameter of quartz sand aggregate is one or more of 2-4 meshes, 4-6 meshes, 6-8 meshes, 8-16 meshes, 16-26 meshes, 26-40 meshes, 40-70 meshes, 70-100 meshes, and 70-120 meshes;

Glass particle aggregate is the broken glass with particle diameter falling into the range of 2-120 meshes, and the particle diameter of glass particle aggregate is one or more of 2-4 meshes, 4-6 meshes, 6-8 meshes, 8-16 meshes, 16-26 meshes, 26-40 meshes, 40-70 meshes, 70-100 meshes, and 70-120 meshes;

Quartz powder is the 325-mesh or 400-mesh quartz mineral fine powder;

Glass powder is the powder grinded by 325-mesh or 400-mesh broken glass;

Particle diameter of tile power is 325 mesh or 400 mesh;

Superfine quartz powder is the quartz ultrafine powder falling into the range of 600-3000 meshes.

Quartz sand aggregate is the quartz mineral particles with particle diameter in the range;

A preparation method of artificial stone with non-natural mineral as main material includes the following steps:

(1) Materials mixing: Put the raw materials of artificial stone except for pigment into an agitator to stir evenly according to the formula ratio, and mix them to obtain a mixture; such mixing operation is to mix in the mixing disc through blanking or mix manually;
(2) Materials spreading: Blank the mixture into a die, to complete the materials spreading;
(3) Pressing: Eliminate the air in the mixture in step (2) by use of vacuum extractor, and when the vacuum degree reaches −96 kPa or above, start the pressing equipment, to press the mixture into a green body;
(4) Curing: Send the green body into a curing equipment for curing, with curing temperature 80-100° C., and curing time 50-120 min;
(5) Post-treatment: The artificial stone after curing will be subject to one or more of polishing treatment, crystal treatment, and heterotypic processing, to obtain the finished artificial stone;

The pigment of artificial stone raw materials is added in Step (1) or Step (2), or the mentioned pigment is added in in Step (1) or Step (2) in batches.

Further, in step (1), the operation to put the raw materials of artificial stone into the agitator according to formula ratio is: Put the quartz sand aggregate and glass particle aggregate into the agitator by formula ratio, and mix them evenly, to obtain the aggregate particles; put the quartz power, glass powder, tile powder and ultrafine quartz powder respectively into the aggregate particles under continuous mixing to mix jointly and evenly;

Then, add the resin added with curing agent and coupling agent and mixed evenly ahead of time into the mixture of aggregate particles and power under mixing, to mix them at a high speed, until the mixture becomes uniform.

The method to add the pigment contained in the raw materials of the artificial stone is: In step (1), add the pigment into the resin ahead of time and mix them evenly; or, in step (2), lead the pigment by powder spreader or manual powering into the designated position of mixture in the spreading die to form patterns.

It is important to note that, the raw materials of artificial stone are put into the agitator according to formula ratio; in the formula, when one of quartz sand aggregate, quartz powder, glass powder, ultrafine quartz power and pigment is zero, it will be not added into the agitator.

Further, in step (5), heterotypic processing refers to: the artificial stone after curing is subject to one or more of beveling, rounding, trepanning, sand blasting, abrasive brushing, copying, and engraving, and after completion of heterotypic processing, the part needing polishing of artificial stone will be grinded and polished through polishing with grinding machine and/or waterproof abrasive paper.

This invention is further elaborated via specific embodiments.

The formula of raw materials of artificial stone with non-natural mineral as main material calculated by mass percent as mentioned in claims 1-9 is as shown in Table 1.

TABLE 1

| Raw material (mass percent %) | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| Quartz sand aggregate | 45 | 0 | 0 | 0 | 0 | 0 | 0 | 0 | 0 |
| Glass particle aggregate | 14 | 50 | 60 | 57 | 58 | 50 | 60 | 52 | 55 |
| Quartz powder | 0 | 0 | 0 | 0 | 0 | 0 | 0 | 0 | 0 |
| Glass powder | 27 | 20 | 5 | 20 | 25 | 0 | 0 | 0 | 0 |
| Tile powder | 5 | 18 | 20 | 8 | 5 | 32 | 20 | 28 | 26 |
| Ultrafine quartz powder | 0 | 0 | 5 | 3.8 | 2 | 0 | 5 | 2 | 4 |
| Pigment | 0 | 1.6 | 0 | 2 | 1.8 | 2 | 0 | 1.84 | 1.8 |
| Resin | 8.8 | 10 | 9.7 | 9 | 8 | 15.4 | 14.5 | 16 | 13 |
| Curing agent | 0.1 | 0.2 | 0.15 | 0.1 | 0.16 | 0.3 | 0.25 | 0.08 | 0.16 |
| Coupling agent | 0.1 | 0.2 | 0.15 | 0.1 | 0.04 | 0.3 | 0.25 | 0.08 | 0.04 |

The formula of raw materials of artificial stone with non-natural mineral as main material calculated by mass percent as mentioned in claims 1-9 satisfies the following conditions: the total mass of quartz sand aggregate and glass particle aggregate accounts for 50-60% of total raw materials of the artificial stone, and the total mass of quartz powder, glass powder, tile powder and ultrafine quartz powder accounts for 25-32% of total raw materials of the artificial stone; in the formula of artificial stone, the total mass of non-natural mineral particle aggregate and glass powder is greater than the total mass of quartz sand aggregate, quartz powder and ultrafine quartz powder.

A preparation method of the artificial stone with non-natural mineral as main material as mentioned in embodiments 1-9 includes steps (1)-(5):

Step (1) Materials mixing: Put the raw materials of artificial stone except for pigment into an agitator to stir evenly according to the formula ratio, and mix them to obtain a mixture. The operation to put the raw materials of artificial stone into the agitator according to formula ratio is: Put the quartz sand aggregate and non-natural mineral particle aggregate into the agitator by formula ratio, and mix them evenly, to obtain the aggregate particles; put the quartz power, glass powder, tile powder and ultrafine quartz powder respectively into the aggregate particles under continuous mixing to mix jointly and evenly;

Then, add the resin added with curing agent and coupling agent and mixed evenly ahead of time into the mixture of aggregate particles and power under mixing, to mix them at a high speed, until the mixture becomes uniform.

Step (2) Materials spreading: Blank the mixture into a die, to complete the materials spreading;

Step (3) Pressing: Eliminate the air in the mixture in step (2) by use of vacuum extractor, and when the vacuum degree reaches −96 kPa or above, start the pressing equipment, to press the mixture into a green body;

Step (4) Curing: Send the green body into curing equipment for curing, with curing temperature 80-100° C., and curing time 50-120 min;

Step (5) Post-treatment: The artificial stone after curing will be subject to one or more of polishing treatment, crystal treatment, and heterotypic processing, to obtain the finished artificial stone. Heterotypic processing refers to: the artificial stone after curing is subject to one or more of beveling, rounding, trepanning, sand blasting, abrasive brushing, copying, and engraving, and after completion of heterotypic processing, the part needing polishing of artificial stone will be grinded and polished through polishing with grinding machine and/or waterproof abrasive paper.

In step (4) of the preparation method of artificial stone with non-natural mineral as main material as mentioned in embodiments 1-2, the curing temperature is controlled to be 80-85° C., and the curing time is controlled to be 50-60 min;

In step (4) of the preparation method of artificial stone with non-natural mineral as main material as mentioned in embodiments 2-4, the curing temperature is controlled to be 85-90° C., and the curing time is controlled to be 60-80 min;

In step (4) of the preparation method of artificial stone with non-natural mineral as main material as mentioned in embodiments 5-7, the curing temperature is controlled to be 90-95° C., and the curing time is controlled to be 80-100 min;

In step (4) of the preparation method of artificial stone with non-natural mineral as main material as mentioned in embodiments 8-9, the curing temperature is controlled to be 95-100° C., and the curing time is controlled to be 100-120 min.

In the formula of artificial stone as mentioned in embodiments 2-5, the filler is mainly based on glass particle aggregate and glass powder, and the resin used in these embodiments is obviously lower than that used in other embodiments. The performance parameters of artificial stone with non-natural mineral as main material in embodiments 1-9 are as shown in Table 2.

TABLE 2

| Main detection items | Index range |
| --- | --- |
| Water absorption | ≤0.05% |
| Resistance to pollution | Level 2 |
| Resistance to chemical corrosion | After test, there is no significant damage. |
| Moh's hardness | 5 |
| Coefficient of linear expansion | ≤3.5 × 10$^{-5}$ |
| Ageing-resistant performance | After test, there is no damage, and the color change is level 1 or level 2. |
| Abrasive resistance | ≤3.5 × 10$^{-3}$ |
| High temperature resistance | After test, there is no damage, as well as no significant color change. |
| Bending strength | 30~70 MPa |
| Compression strength | 150~200 MPa |
| Falling ball impact resistance | ≥3.5 J |
| Frost and thaw resistance | After test, there is no damage, and the bending strength ≥30 MPa. |
| Heavy metal content | Up to standard |
| Radioactivity | Class A |

Comparison 1

In the prior art, the formula of raw materials by mass percent of artificial quartz stone with quartz sand/powder as main material is: quartz particle 60%, quartz powder 24%; colored pigment 1.2%; silane coupling agent 0.5%; unsaturated polyester resin 13% and curing agent 1.3%. The preparation steps of the artificial quartz are:

(1) Materials mixing: Put the raw materials into an agitator to stir evenly according to the formula ratio, and mix them further;

(2) Materials spreading: Spread the materials mixed well;

(3) Pressing: Vaccuumize the materials spread well and press them into a green body;

(4) Curing: Send the green body into a curing oven for curing;

(5) Finishing: Grind and polish the green body after curing to obtain finished artificial quartz product.

The consumption of waste materials comparison of the artificial stone with non-natural mineral as main material as mentioned in embodiments 1-9 and the artificial quartz stone as mentioned in comparison 1 is as shown in Table 3.

TABLE 3

| Example | Product Consumption of waste materials (by mass percent) |
| --- | --- |
| Embodiment 1 | 47% |
| Embodiment 2 | 88% |
| Embodiment 3 | 85% |
| Embodiment 4 | 85% |
| Embodiment 5 | 88% |
| Embodiment 6 | 82% |
| Embodiment 7 | 80% |

TABLE 3-continued

| Example | Product Consumption of waste materials (by mass percent) |
|---|---|
| Embodiment 8 | 80% |
| Embodiment 9 | 81% |
| Comparison | 0 |

It can be known from the Table above that, the consumption of waste materials of the artificial stone raw materials with non-natural mineral as main material in this invention, which have high waste consumption compared with the existing artificial quartz stone.

The technical principle of this invention is described in combination with the specific embodiments above. These descriptions are only to explain the principle of this invention, and cannot explain the limitation on protection range of this invention in any way. Based on the explanation here, the technical personnel in this field can imagine other specific embodiments without paying creative labor, and these embodiments will fall into the protection range of this invention.

The invention claimed is:

1. A preparation method of a finished artificial stone with a non-natural mineral as a main material, comprising the steps of:
   (1) mixing a plurality of raw materials by putting the raw materials of an artificial stone except for a pigment into an agitator to stir according to a formula ratio, and mixing the raw materials to obtain a mixture, wherein the raw materials of the artificial stone is calculated by mass percent to include: a resin 8-16%, a quartz sand aggregate 0-45%, a glass particle aggregate 14-60%, a quartz powder being 0-32%, a glass powder and a tile powder 0-32%, an ultrafine or superfine quartz powder 0-5%, and a pigment 0-2%;
   wherein the quartz sand aggregate has a particle diameter falling into a range of 2-120 meshes; the glass particle aggregate is a broken glass with particle diameter falling into a range of 2-120 meshes; the quartz powder has a diameter of 325-mesh or 400-mesh; the glass powder is a 325-mesh or 400-mesh broken glass; the tile powder has a diameter of 325-mesh or 400-mesh; and the ultrafine or superfine quartz powder has a diameter the range of 600-3000 meshes;
   (2) spreading the raw materials by blanking the mixture into a spreading die to complete the materials spreading;
   (3) pressing by eliminating air in the mixture in step (2) by use of a vacuum extractor, and when a vacuum degree reaches −96 kPa or above, start a pressing equipment to press the mixture into a green body;
   (4) curing by sending the green body into a curing equipment with a curing temperature 80-100° C., and a curing time 50-120min;
   (5) post-treatment of the artificial stone after the curing in step (4) is selected from a group consisting of a polishing treatment, a crystal treatment, a heterotypic processing, and any combination thereof; wherein the finished artificial stone is obtained;
   wherein the pigment in the raw materials of the artificial stone is added in step (1) or step (2), or the pigment is added in batches in step (1) and step (2); and
   wherein forming the finished artificial stone with the non-natural mineral as the main material is done by the steps (1)-(5), and the artificial stone is further characterized by that:
   the main material of the artificial stone further includes a curing agent and a coupling agent, wherein a mass ratio of the curing agent and the resin used is 0.5-2: 100 and a mass ratio of the coupling agent and the resin used is 0.5-2:100;
   in steps (1) to (5) for the preparation of the finished artificial stone, a total mass of the glass particle aggregate and the glass powder is greater than a total mass of the quartz sand aggregate, the quartz powder and the ultrafine quartz powder;
   the glass particle aggregate and the glass powder are made of a recycled waste glass, and the tile powder is made of a recycled waste vitreous polished tiles, and wherein the total mass of quartz sand aggregate and glass particle aggregate accounts for 50-60% of total raw materials of the artificial stone.

2. The preparation method of the finished artificial stone with non-natural mineral as main material in accordance with claim 1, wherein step (1) for putting the raw materials of artificial stone into the agitator according to the formula ratio further includes
   putting the quartz sand aggregate and the glass particle aggregate into the agitator by the formula ratio, and mixing to obtain a mixed aggregate particles;
   putting the quartz power, the glass powder, the tile powder and the ultrafine quartz powder respectively into the mixed aggregate particles under a continuous mixing to mix jointly; and then, adding the resin with the curing agent and the coupling agent that are all pre-mixed, and mixing into the mixed aggregate particle particles and power under mixing until uniform.

3. The preparation method of the finished artificial stone with non-natural mineral as main material in accordance with claim 2, characterized by that: the method to add the pigment contained in the raw materials of the artificial stone is:
   in step (1), add the pigment into the resin ahead of time and mix;
   or, in step (2), lead the pigment by powder spreader or manual powering into a designated position of mixture in the spreading die to form patterns.

4. The preparation method of the finished artificial stone with non-natural mineral as main material in accordance with claim 1, wherein in step (5), heterotypic processing refers to: the artificial stone after curing is subject to one or more of beveling, rounding, trepanning, sand blasting, abrasive brushing, copying, and engraving, and after completion of heterotypic processing, a portion of the artificial stone requiring polishing is grinded and polished through polishing with a grinding machine and/or a waterproof abrasive paper.

* * * * *